March 7, 1967

J. GONSKI 3,307,877

BORING TYPE CONTINUOUS MINER WITH
CENTRAL RIPPER CUTTER DRUM

Filed July 17, 1964

INVENTOR.
Joseph Gonski

BY
*Hill, Sherman, Meroni, Gross & Simpson*
ATTORNEYS

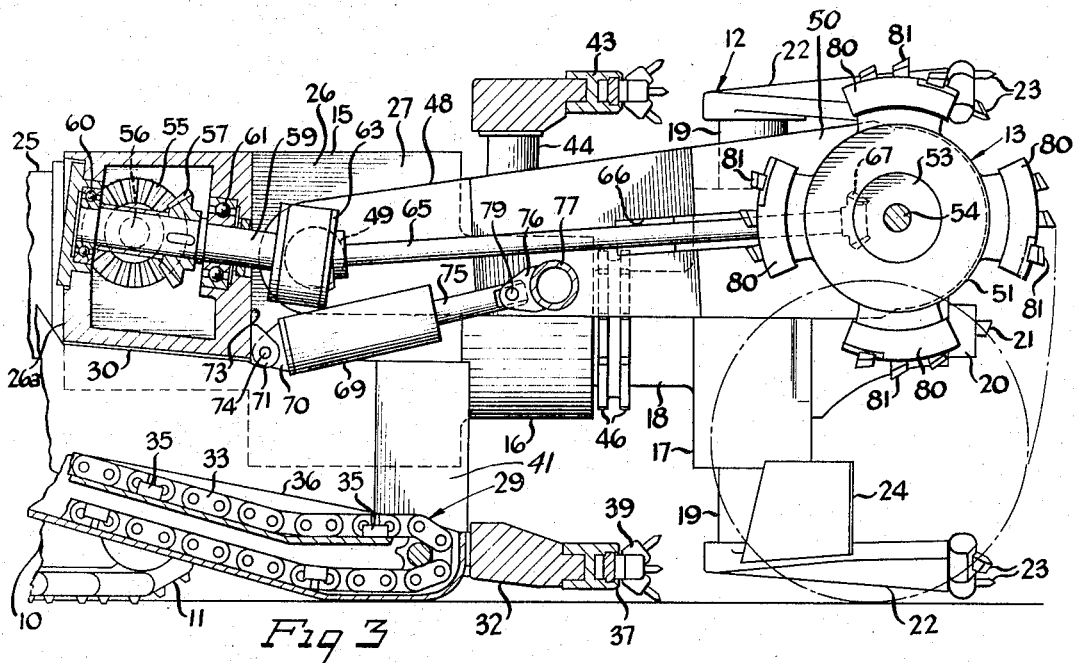
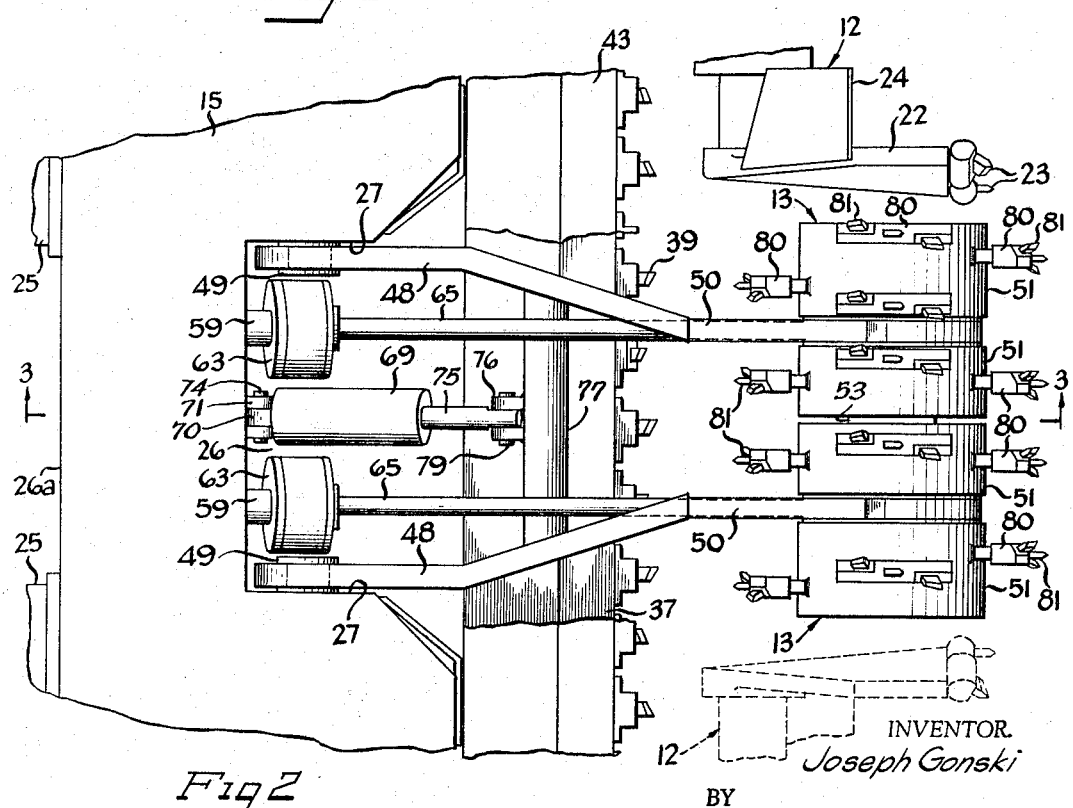

United States Patent Office 3,307,877
Patented Mar. 7, 1967

3,307,877
BORING TYPE CONTINUOUS MINER WITH
CENTRAL RIPPER CUTTER DRUM
Joseph Gonski, Chicago, Ill., assignor, by mesne assignments, to Westinghouse Air Brake Company, Pittsburgh, Pa., a corporation of Pennsylvania
Filed July 17, 1964, Ser. No. 383,324
7 Claims. (Cl. 299—57)

This invention relates to improvements in continuous mining machines of the boring type and more particularly relates to an improved form of low height borer in which a ripper cutter drum mines in the space between the boring heads of the machine.

In the design of continuous mining machine of the boring type, the height of the machine has previously been reduced by providing more than two boring heads either arranged in aligned relation with respect to each other and cutting in interdigitating relation with respect to each other, or with the center boring head extending in front of or behind the two side or outer boring heads.

With such machines, particularly where the heads are laterally aligned, the center boring head and one outer boring head will rotate in one direction and tend to progress the cuttings toward the center of the machine and the opposite side boring head will rotate toward the center boring head and the cuttings will be collected just rearwardly of the two boring heads rotating in opposite directions. This results in a relatively small throat for collecting and transferring the cuttings for loading, and in all such boring head arrangements difficulty has been encountered in progressing the cuttings to a common point where they may be efficiently collected and conveyed away from the machine for loading. In addition to this, the cutting forces are unbalanced and the front overhang is extremely great where the center boring head is spaced in front of or behind the two side boring heads.

A principal object of the present invention is to cure the foregoing deficiencies in low height continuous boring types of miners by utilizing a ripper type of mining head between the two widely spaced outer boring heads, rotating in a direction to progress the mined material toward the conveyor of the machine.

Another object of the invention is to improve upon the low height continuous mining machine of the rotary boring heretofore in use by utilizing two relatively widely spaced side boring heads and providing a throat and conveyor between these boring heads and spaced rearwardly therefrom and by mining the space between the boring heads by an oscillatably movable rotary cutter drum of the ripper type, cycling up and down during the operation of mining.

A still further object of the invention is to provide a law height continuous mining machine of the rotary boring type including a central conveyor, a cutter frame disposed above and extending across the receiving end of the conveyor and supporting two rotary boring heads on opposite sides of the conveyor, in which the space between the rotary boring heads is mined by a ripper type cutter drum, supported in advance of the throat of the cutter frame and including two support arms pivoted to the cutter frame, and individual coaxially rotating cutter drums supported on said arms and connected together to be cycled up and down from the floor to roof of the mine, and driven by independent drive mechanisms extending along each of the supports for the cutter drums.

These and other objects of the invention will appear from time to time as the following specification proceeds and with reference to the accompanying drawings wherein:

FIGURE 2 is a fragmentary plan view of the front end portion of the machine, looking substantially along line 2—2 of FIGURE 1; and FIGURE 3 is a fragmentary sectional view taken substantially along line 3—3 of FIGURE 2.

Figure 1:
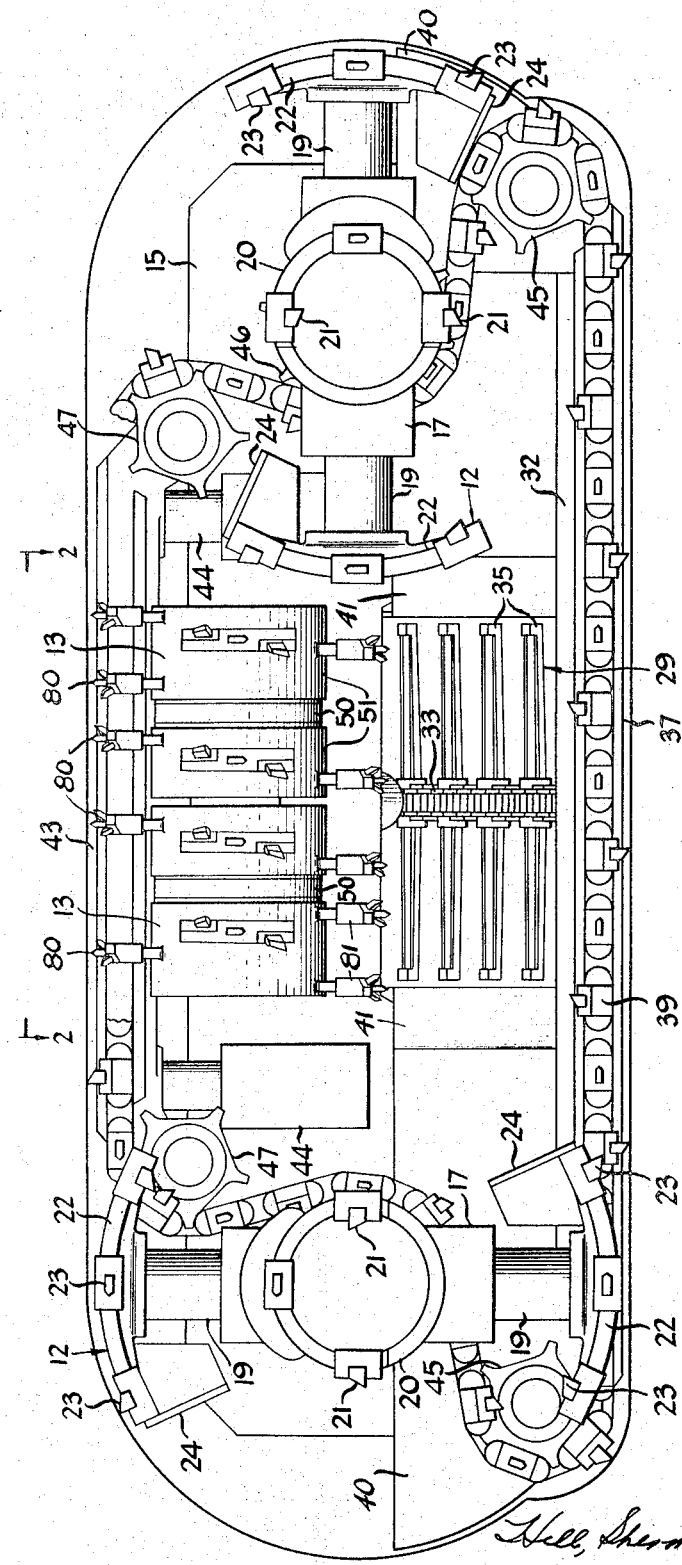
FIGURE 1 is a front end view of a continuous mining machine constructed in accordance with the principles of the present invention.

In the embodiment of the invention illustrated in the drawings, I have shown in FIGURES 1, 2 and 3, a continuous mining machine of the boring type having a mobile main frame 10 supported on laterally spaced continuous traction tread devices 11, which serve to tram the machine from working place to working place and to feed two laterally spaced outer boring heads 12, 12 and coaxial central ripper drums 13, 13 into the working face of a mine. The continuous traction tread devices 11 are of a conventional form and support the main frame 10 for movement about the mine in a conventional manner and are driven from individual motors and speed reducers (not shown) in a manner well known to those skilled in the art, so not herein shown or described further.

The mining machine also includes a cutter frame structure 15 supported on and extending ahead of the main frame 10. The cutter frame structure 15 is mounted on the main frame 10 for vertical adjustable movement with respect to said main frame and for angular adjustable movement about axes extending transversely and longitudinally of said main frame in a conventional manner, and no part of the present invention so not herein shown or described further.

The cutter frame structure 15 has outer hubs 16 extending from opposite sides thereof and on opposite sides of a forwardly opening recessed portion 26 of said cutter frame. The hubs 16 project forwardly of the cutter frame structure 15 and form supports for the boring heads 12, 12.

The boring heads 12, 12 may be of various well known forms and as herein shown, each have a diametrically extending boring arm 17 extending equal distances from opposite sides of a hub 18 of the boring head. The boring arm 17 has axially aligned telescopic arms 19 extending from opposite ends thereof and held in fixed relation with respect to each other and extensibly and retractibly moved with respect to said boring arm 17 by a conventional form of adjusting mechanism, which is no part of the present invention so need not herein be shown or described.

Each boring head also has a central annular cutter 20 projecting forwardly of the boring arm 17, coaxial with the axis of rotation thereof, and having cutter bits 21, 21 mounted thereon and projecting forwardly therefrom for cutting an annular kerf adjacent the center of the seam.

The telescopic arms 19 have cutter supports 22 projecting forwardly therefrom, and of an arcuate form in front view, conforming to the arc of travel of said cutter support and having the usual cutter bits 23 projecting therefrom and pitched to cut clearance for said cutter supports. Each cutter support 22 also has a plow 24 extending from the advance end portion thereof. The plow 24 extends angularly inwardly from the advance end of the cutter support 22 toward the center of rotation of the boring head, and is pitched to progress the mined material toward the center of the machine into the paths of the ripper cutter drums 13, 13.

The boring heads 12 are independently driven from individual motors 25, 25 supported on a rear wall 26a of the cutter frame 15 and projecting rearwardly therefrom. The motors 25 are only fragmentarily shown in FIGURES 2 and 3 and the drive therefrom to the cutter drums 12 may be a conventional geared reduction drive, so said motors and the geared drive from said motors to the ndividual boring heads 12 need not herein be shown or described further.

The central recessed portion 26 of the cutter frame 15 has parallel spaced side walls 27, opening downwardly to a conveyor 29 extending along the main frame 10 in registry with a downwardly opening throat 30 in the cutter frame 15, providing a space to accommodate the cuttings to be carried by the conveyor 29 beyond the rear end of the machine for loading into a conveyor, shuttle cars or like material carrying devices. The conveyor 29 is herein shown as being a center strand laterally flexible endless chain and flight type of conveyor including a center strand chain 33 pivotally connected to longitudinally spaced flights 35, for universal movement with respect hereto in a conventional manner, and movable along a conveyor frame 36 extending from a support 32 for a lower trimmer bar 37. The lower trimmer bar 37 has the usual trimmer chain 39 guided for movement therealong and is suspended in a conventional manner from the cutter frame 15 on hydraulic jacks (not shown) for adjusting said trimmer bar with respect to the ground and raising said trimmer bar and the conveyor 29 when it is desired to tram the machine from place to place.

Pusher plates 40 extend along the forward end portion of the cutter frame 15 beind the boring heads 12 and terminate at their inner ends into material retaining plates 41 diverging from the pusher plates 40 toward the side walls of the conveyor, and extending along the throat 30 along opposite sides of the conveyor frame 36 to retain the mined material thereto.

An upper trimmer bar 43 is mounted on the cutter frame 15 in advance of the forward end thereof in vertical alignment with the lower trimmer bar 37, on hydraulic jacks 44. The hydraulic jacks 44 are mounted on the front face of the cutter frame 15 and serve to vertically adjust said trimmer bar with respect to said cutter frame in accordance with the thickness of seam to be mined, and to hold said trimmer bar in position during the mining operation.

The trimmer chain 39 is trained along the lower trimmer bar 37 and round corner sprockets 45 at opposite ends of the lower trimmer bar 39 and inwardly therefrom. One run of the trimmer chain is trained around a drive sprocket 46 coaxial with the axis of the hub 16 and 18 and rotatably driven by the hub 18. From thence the trimmer chain extends upwardly around a corner sprocket 47 to and along the upper trimmer bar 43 and around an opposite corner sprocket 47 and downwardly along the inside of a hub 18 and outwardly therefrom around the opposite corner sprocket 45. A means may be provided to maintain tension on the trimmer chain 39, when the trimmer bars are in their various positions of vertical adjustment with respect to each other. Said means may be of a conventional form, and is no part of the present invention so need not herein be shown or described.

Referring now in particular to the coaxial cutter drums 13 disposed between the boring heads 12, 12, said cutter drums are each mounted on a separate boom arm 48 extending within the recessed portion 26 of the cutter frame 15 between the walls 27, 27 thereof, and pivotally mounted on said walls on pivot pins 49 mounted on and extending from the walls 27 toward each other. As shown in FIGURE 2, the boom arms 48 extend in parallel relation with respect to each other to positions adjacent the forward end portion of the cutter frame 15, and then extend angularly inwardly with respect to each other to parallel forwardly extending arm portions 50, extending along the insides of drum members 51, 51 of the cutter drums 13. The arm portions 50 form bearing supports for said cutter drums, supporting said cutter drums for rotation about axes extending transversely of said boom arms and parallel to the axes of pivotal movement thereof. The supports for the drum sections 51, 51 on the arms 50 may be like those shown and described in an application Serial No. 277,540 filed by Richard C. Lundquist on May 2, 1963 and now Patent No. 3,157,438 dated November 17, 1964 and no part of the present invention so not herein shown or described in detail. The cutter drums 13, 13 are separated by a spacer 53, forming a thrust bearing between the adjacent drum sections 51, 51 and mounted on a shaft 54 extending between said drum sections and holding said drum sections in aligned relation with respect to each other. The shaft 54 is only an aligning shaft and serves to maintain the drum sections in aligned relation with respect to each other.

The two cutter drums 13, 13 are individually driven from the associated motors 25, 25 on opposite sides of the cutter frame 15 by independent drives making it unnecessary to synchronize the two motors to rotatably drive the cutter drums.

The drive to the cutter drum 13, shown in FIGURE 3 as being the left hand cutter drum, includes a bevel gear 55 on a shaft 56 extending transversely of the cutter frame 15 and meshing with and driving a bevel gear 57 on a longitudinally extending shaft 59 journalled in the cutter frame 15 on anti-friction bearings 60 and 61. The shaft 59 is inclined downwardly from the rear to the forward end portion thereof and extends into the space between the side walls 27 and has driving connection with a universal drive coupling 63. The universal drive coupling 63 may be of a conventional form and has a transverse axis coaxial with the axis of the pin 49, and drives a longitudinal shaft 65 extending along a slot 66 formed in the arm portion 50. The shaft 65 is suitably journaled in the arm portion 50 and extends within the drum 13 and has a bevel pinion 67 at its forward end rotatably driving the two drum sections 51, 51 of a cutter drum 13 in a manner similar to that shown and described in application Serial No. 277,540 filed May 2, 1963, and no part of the present invention so not herein shown or described further.

The two cutter drums 13, 13 are thus independently driven with respect to each other by the individual motors 25, 25 but are maintained in aligned relation with respect to each other by the shaft 54. The motors 25, therefore, need not be synchronized and besides driving their individual cutter drums 13, also drive an associated rotary boring head 12, with the result that one motor only is loaded by one boring head and cutter drum.

A hydraulic jack 69 is provided to raise and lower the boom arms 48 together during operation of the boring heads 12, 12 and the advance of the machine into the working face of the mine by operation of the continuous traction tread devices 11, 11. As shown in FIGURES 2 and 3, the hydraulic jack 69 has an ear 70 extending from the head end thereof between connector brackets 71, extending forwardly of a front wall 73 of the recessed portion of the cutter frame, within which the boom arms 48, 48 are mounted. A pivot pin 74 serves to connect ear 70 between connector brackets 71. The hydraulic jack 69 also has an extensible piston rod 75 extending between connector brackets 76, extending rearwardly of a cross brace or tube 77 connecting the boom arms 48 together. A pivot pin 79 is provided to pivotally connect said piston rod between said connector brackets.

The hydraulic jack 69 may be alternately supplied with fluid under pressure to its head and piston rod ends under a suitable system of fluid pressure valves (not shown), which may be operated at the upper and lower ends of travel of the boom arms, in a suitable manner, for automatically cycling the boom arms 50 up and down to feed the cutter drums 13, 13 upwardly and downwardly along a mine face during operation of the boring heads 12, 12, and feeding movement of said boring heads into the mine face by operation of the continuous tread devices 11, 11.

Each drum section 51 is shown as having a series of cutter supports 80, 80 spaced radially from the periphery thereof and welded or otherwise secured thereto. The cutter supports 80, 80 are spaced along the width of each drum section 51, to position certain of said cutter supports along the edges of the associated drum section and certain other of said cutter supports inwardly of the edges of the drum section, to cut clearance for the individual drum section as well as for the arm portion 50. The cutter supports 80 have the usual cutter bits 81 projecting radially therefrom and inclined to one side or the other of center to cut clearance for said cutter supports and for the drum sections 51, to enable the cutter drums 13 to dislodge the mined material from a coal face between the boring heads 12, 12 in a continuous operation.

It will here be noted that the cutter bits 81 are pitched to cut from the roof to floor of the mine, as the cutter drums rotate in the same direction, and to thereby progress the cuttings backwardly to the conveyor 29 for the entire cutting operation.

It should further be understood that the cutter drums 13 are driven at a higher rate of speed than the linear speed of travel of said cutter drums vertically along the mine face. The cutter drums 13, 13 will thus continuously mine during both up and down feeding movement thereof.

It may be seen from the foregoing that with the machine of the present invention, the cutter drums 13, 13 mine a relatively wide swath in the coal face between the boring heads 12, 12 and thereby maintain a wide throat between said boring heads and impel not only their own cuttings, but also the cuttings of the boring heads toward the conveyor, to be picked up thereby.

While I have herein shown and described one form in which the invention may be embodied, it may readily be understood that various variations and modifications in the invention may be attained without departing from the spirit and scope of the novel concepts thereof.

I claim as my invention:

1. In a continuous mining machine having a mobile main frame,
   a cutter frame mounted on said main frame and projecting forwardly therefrom,
   two widely spaced boring heads mounted on said cutter frame and extending in advance thereof and having cutter bit carrying cutter supports projecting forwardly therefrom, performing rotary boring operations from the roof to the floor of a mine,
   at least one boom arm pivotally mounted on said cutter frame for movement about a horizontal transverse axis and extending in advance of said cutter frame,
   means vertically feeding said boom arm about said horizontal transverse axis,
   a ripper cutter drum mounted on the end of said boom arm between said boring heads for rotation about an axis parallel to the axis of pivotal movement of said boom arm and having cutter bits projecting therefrom,
   and means driving said ripper cutter drum by power upon feeding movement thereof by said boom arm to mine a vertical swath in the mine face between said boring heads.

2. In a continuous mining machine having a mobile main frame,
   a cutter frame mounted on said main frame and extending in advance thereof,
   two laterally spaced boring heads mounted on said cutter frame and extending in advance thereof and having cutter bit carrying cutter supports projecting forwardly therefrom,
   upper and lower trimmer cutting means mounted between said boring heads and effective to cut along the roof and floor of a mine between said boring heads,
   a ripper cutter drum disposed between said boring heads and comprising two sets of coaxial drum sections having cutter bits projecting from the peripheries thereof,
   an individual boom arm for supporting each set of drum sections,
   drive means for each set of drum sections extending along an associated boom arm for driving said sets of drum sections independently of each other at cutting speeds, during both upward and downward movement of said drum sections along a mine face,
   and means for feeding said boom arm up and down to cycle said cutter drums up and down during an operation of feeding said mining heads and cutter drum into a working face, to effect the mining of a continuous vertical swath between said boring heads.

3. In a continuous mining machine having a mobile main frame,
   a conveyor extending along said main frame from a position adjacent the ground in advance of said main frame and beyond the rear end thereof,
   a cutter frame mounted on said frame above said conveyor and extending in advance thereof and having a central throat extending along said conveyor,
   two laterally spaced rotary boring heads mounted on said cutter frame and extending in advance thereof and having rotary cutter bit carrying cutter supports projecting forwardly therefrom, said mining heads being spaced on each side of said throat and each mining head being driven in a direction to progress the cuttings mined in front of said throat,
   upper and lower trimmer cutting means mounted behind said boring heads and effective to cut along the roof and floor of a mine between said boring heads,
   a ripper cutter drum having cutter bits projecting radially therefrom, disposed between said boring heads in front of said throat,
   at least one boom arm transversely pivoted to said cutter frame for angular up and down movement and extending in advance thereof,
   means rotatably mounting said ripper cutter drum on said boom arm for rotation about an axis parallel to the transverse axis of connection of said boom arm to said cutter frame,
   other means driving said ripper cutter drum in a direction to progress the cuttings to said throat and conveyor,
   and means angularly moving said boom arm up and down to feed said ripper cutter drum between the upper and lower extremities of the mine to mine a vertical swath in the mine face between said boring heads.

4. In a continuous mining machine having a mobile main frame,
   a conveyor extending along said main frame from a position adjacent the ground in advance of said main frame and rearwardly beyond the rear end thereof,
   a cutter frame mounted on said main frame and extending in advance thereof and having a central throat extending along said conveyor,
   two laterally spaced boring heads mounted on said cutter frame on opposite sides of said throat and extending in advance thereof and having rotary cutter bit carrying cutter supports projecting forwardly therefrom,
   upper and lower trimmer cutting means mounted behind said boring heads and effective to cut along the roof and floor of a mine between said boring heads,
   a boom transversely pivoted to said cutter frame on opposite sides of said throat and projecting forwardly therefrom between said mining heads,
   means for feeding said boom vertically in up and down directions,
   and a rotary cutter drum rotatably mounted on the end of said boom and extending therefrom between said mining heads and rotatably driven to progress the material mined toward said throat and conveyor during up and down movement of said boom, and at a speed sufficiently high to cut during up and down movement thereof while said rotary cutter drum rotates in a single direction.

5. A continuous mining machine in accordance which claim 4 in which the rotary cutter drum comprises two coaxial independently rotatably driven drum sections mounted on said boom and having cutter supports extending therefrom and spaced therealong and having cutter bits projecting radially therefrom.

6. In a continuous mining machine having a mobile main frame, a cutter frame mounted on said main frame and extending in advance thereof, said cutter frame having a downwardly opening throat extending therealong and a forwardly opening recessed portion opening to said throat, a conveyor extending along said throat and main frame from a position adjacent the ground in advance of the forward end of said main frame, two laterally spaced rotary boring heads mounted on said cutter frame for rotation about axes extending longitudinally of the machine on opposite sides of said throat and having cutter bit carrying cutter supports projecting forwardly therefrom, one being spaced on each side of said throat, upper and lower trimmer cutting means mounted behind said boring heads and effective to cut along the roof and floor of a mine between said boring heads, a boom transversely pivoted to said cutter frame within the forwardly opening recessed portion thereof and including two laterally spaced boom arms extending in advance thereof, a rotary cutter drum rotatably supported on each boom arm and having cutter bit carrying cutter supports projecting radially outwardly therefrom, means maintaining said two cutter drums in aligned relation with respect to each other, and hydraulic cylinder and piston means connected between said cutter frame and boom arms for cyclically moving said boom arms from the roof to floor and floor to roof of a mine during rotation of said rotary boring heads and advance of the machine into the working face of a mine.

7. A continuous mining machine in accordance with claim 6 in which independent drives are provided for each rotary cutter drum and rotate said cutter drums to progress the cuttings toward said conveyor and at a sufficiently high rate of speed to cut as the boom arms move the cutter drums from the roof to the floor and floor to roof of a mine as said cutter drums rotate in a single direction.

References Cited by the Examiner

UNITED STATES PATENTS

| | | | |
|---|---|---|---|
| 640,621 | 1/1900 | Bailey | 175—91 |
| 2,595,398 | 5/1952 | Lewis | 299—86 X |
| 2,734,731 | 2/1956 | Cartlidge et al. | 299—59 X |
| 3,096,082 | 7/1963 | Long | 299—59 X |

ERNEST R. PURSER, *Primary Examiner.*